(12) United States Patent
Nakayoshi

(10) Patent No.: US 8,414,051 B2
(45) Date of Patent: Apr. 9, 2013

(54) ELECTRICAL COMPONENT HOUSING DEVICE AND CONSTRUCTION MACHINE INCORPORATED WITH THE SAME

(75) Inventor: Takanobu Nakayoshi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 107 days.

(21) Appl. No.: 13/151,598

(22) Filed: Jun. 2, 2011

(65) Prior Publication Data
US 2011/0304169 A1 Dec. 15, 2011

(30) Foreign Application Priority Data
Jun. 15, 2010 (JP) ................................ 2010-136071

(51) Int. Cl.
| H02B 1/06 | (2006.01) |
| B65D 25/06 | (2006.01) |
| B60R 7/04 | (2006.01) |
| B60R 16/02 | (2006.01) |
| B62D 25/06 | (2006.01) |

(52) U.S. Cl. ...................... 296/37.15; 220/531; 361/610
(58) Field of Classification Search ..................... 174/50, 174/58, 72 A; 220/531; 296/37.1, 37.15; 361/610
See application file for complete search history.

(56) References Cited

U.S. PATENT DOCUMENTS

| 2,130,250 A | * | 9/1938 | Reed .............................. 361/610 |
| 2,565,314 A | * | 8/1951 | Lewis ........................... 361/610 |
| 3,052,820 A | * | 9/1962 | Kreekon et al. .............. 361/610 |
| 4,658,422 A | * | 4/1987 | Sparks ........................... 379/442 |
| 4,777,559 A | * | 10/1988 | Bar et al. ....................... 361/610 |
| 5,073,841 A | * | 12/1991 | DelGuidice et al. .......... 361/827 |
| 5,406,452 A | * | 4/1995 | Uchiumi ........................ 361/727 |
| 5,526,972 A | * | 6/1996 | Frazier et al. .................. 224/539 |
| 5,626,380 A | * | 5/1997 | Elson et al. .................... 296/39.1 |
| 6,061,229 A | * | 5/2000 | Gates et al. .................... 361/610 |
| 6,066,802 A | * | 5/2000 | Reinke et al. ................... 174/50 |
| 6,469,247 B1 | * | 10/2002 | Dodds et al. .................... 174/50 |

(Continued)

FOREIGN PATENT DOCUMENTS

| JP | 4-134118 | 12/1992 |
| JP | 2000-96609 | 4/2000 |
| JP | 2002-242225 | 8/2002 |
| JP | 2003-13469 | 1/2003 |

(Continued)

OTHER PUBLICATIONS

Extended European Search Report issued on Oct. 19, 2011, in Patent Application No. 11169744.7.

Primary Examiner — Glenn Dayoan
Assistant Examiner — Paul Chenevert
(74) Attorney, Agent, or Firm — Oblon, Spivak, McClelland, Maier & Neustadt, L.L.P.

(57) ABSTRACT

An electrical component housing device is provided with a housing box 21 formed with a maintenance opening 21a, a partition board 24 disposed in the housing box 21 and for separating the inside of the housing box 21, and an electrical component 25 attached to an electrical component attachment surface 24c as one of both surfaces of the partition board 24. The partition board 24 is pivotally supported by the housing box 21 around a pivot shaft 27 between a separation position where the inside of the housing box 21 is separated into an electrical component housing space S3 and a machine tool housing space S4 to face the electrical component attachment surface 24c to the electrical component housing space S3, and a maintenance position to face the electrical component attachment surface 24c to the maintenance opening 21a.

11 Claims, 4 Drawing Sheets

U.S. PATENT DOCUMENTS

| | | | |
|---|---|---|---|
| 6,534,713 B2 * | 3/2003 | Kafer | 174/72 A |
| 6,913,386 B2 * | 7/2005 | Maher et al. | 383/38 |
| 7,816,602 B2 * | 10/2010 | Landry et al. | 174/50 |
| 2003/0127137 A1 | 7/2003 | Van Wie | |
| 2004/0079414 A1 | 4/2004 | Van Wie | |
| 2004/0079415 A1 | 4/2004 | Van Wie | |

FOREIGN PATENT DOCUMENTS

| | | |
|---|---|---|
| JP | 2004-225429 | 8/2004 |
| JP | 2004-351967 | 12/2004 |
| JP | 2007-63876 | 3/2007 |
| JP | 2007-154453 | 6/2007 |

* cited by examiner

US 8,414,051 B2

ELECTRICAL COMPONENT HOUSING DEVICE AND CONSTRUCTION MACHINE INCORPORATED WITH THE SAME

This application is based on Japanese Patent Application No. 2010-136071 filed on Jun. 15, 2010, the contents of which are hereby incorporated by reference.

BACKGROUND OF THE INVENTION

1. Field of the Invention

The present invention relates to an electrical component housing device, for a construction machine such as a hydraulic shovel, for housing electrical components such as a relay member in such a manner that an operator is accessible to the electrical components from the outside for maintenance.

2. Description of the Background Art

The background art of the invention is described by an example of a compact hydraulic shovel called as a mini-shovel as shown in FIGS. 5 and 6.

As shown in FIG. 5, the hydraulic shovel is provided with a crawler-type lower propelling body 1, an upper slewing body 2 which is loaded on the lower propelling body 1 to be sleweable around a vertical axis, and a working attachment 3 mounted on a front part of the upper slewing body 2.

The upper slewing body 2 is provided with an upper frame 4, a seat stand 5 disposed on an upper surface (driver's seat floor 4a) of the upper frame 4, an unillustrated engine and unillustrated peripheral devices thereof which are disposed beneath (in an engine room) the seat stand 5, a base 7 disposed on the seat stand 5, a driver's seat 6 disposed on the seat stand 5 via the base 7, a canopy 9 which covers the driver's seat 6 from above, and a handrail 10 attached to a front end of the driver's seat floor 4a. An operator manipulates various operation levers (a propelling lever 8 is shown as an example of the operation levers in FIG. 5) which are provided on the driver's seat floor 4a in a state that the operator is seated on the driver's seat 6.

In the specification, leftward and rightward directions, and forward and rearward directions are the viewing directions of the operator seated on the driver's seat 6.

In the hydraulic shovel, there is known a technology (e.g. Japanese Unexamined Patent Publication No. 2000-96609, Japanese Unexamined Patent Publication No. 2002-242225, and Japanese Unexamined Patent Publication No. 2003-13469) of forming a housing space for electrical components beneath a driver's seat.

Hereinafter, a comparative example, which is proposed to form a housing space for electrical components beneath a driver's seat, is described referring to FIGS. 7 and 8.

In the comparative example shown in FIGS. 7 and 8, a seat stand 5 formed into a rectangular parallelepiped box-like shape is utilized as a housing box for housing electrical components therein, in other words, a housing box for electrical components is also used as the seat stand 5. Hereinafter, the seat stand 5 is called as a housing box.

Further, in the comparative example shown in FIGS. 7 and 8, the housing box 5 has a partition board 11 which stands upright to separate the inside of the housing box 5 into left and right two spaces S1, S2 to efficiently utilize the space and to simplify the housing structure. The space S1 in the housing box 5 is used to house electrical components 12 such as a relay member, and the space S2 in the housing box 5 is used to house machine tools 13 such as a spanner wrench, and a hammer.

A front surface of the housing box 5 is formed with a maintenance opening 5a for allowing the operator to perform maintenance such as checking or exchanging the electrical components 12, and to put the machine tools 13 in and out of the housing box 5. The housing box 5 is further provided with an opening/closing cover 14 for opening or closing the maintenance opening 5a, and hinges 15, 15 which pivotally support the opening/closing cover 14 to be openable and closable.

A rectangular plate-like support member 16 is fixed in the space S1 (hereinafter, the space S1 is called as an electrical component housing space, and the other space S2 is called as a machine tool housing space) in the housing box 5, as opposed to the maintenance opening 5a. The electrical components 12 are attached to a front surface of the support member 16.

Further, a wiring port 17 is formed in a bottom surface of the housing box 5 within the electrical component housing space S1. A trunk harness 18 (such as a wire harness) formed by bundling harnesses for connecting the respective electrical components 12 to an external device is drawn into the housing box 5 through the wiring port 17. Each of the harnesses branched out of the trunk harness 18 is connected to the corresponding electrical component 12.

In the comparative example shown in FIGS. 7 and 8, the inside of the housing box 5 is separated into the spaces S1, S2 each having a fixed size by the partition board 11, and the machine tool housing space S2 is prepared as a remainder space of the electrical component housing space S1. As a result, the machine tool housing space S2 is inevitably narrow in a condition that the size of the housing box is restricted.

Thus, the housing capacity and/or the sizes of the machine tools 13 housable in the housing box are restricted, and usability of the housing box is poor such as difficulty in putting the machine tools 13 in and out of the housing box.

As a countermeasure against the above drawback, there is proposed an idea of reducing the size of the electrical component housing space S1 and increasing the size of the machine tool housing space S2 by mounting the support member 16 in the housing box 5 in a direction orthogonal to the maintenance opening 5a (in a direction in parallel to the partition board 11).

The above arrangement, however, results in shortage in the space used for maintenance of the electrical components 12, which makes it difficult to perform the maintenance of the electrical components 12.

SUMMARY OF THE INVENTION

An object of the invention is to provide an electrical component housing device that enables to make a space adjacent to an electrical component housing space large, while securing maintenance of electrical components even in a condition that the housing space is restricted, and a construction machine incorporated with the electrical component housing device.

An aspect of the invention is to provide an electrical component housing device for a construction machine. The electrical component housing device includes a housing box which is formed with a maintenance opening; a partition board including front and back surfaces for separating an inside of the housing box in such a manner that two spaces are formed side by side when viewed from the maintenance opening; and an electrical component which is attached to an electrical component attachment surface as one of the front and back surfaces of the partition board. In this arrangement, the partition board is supported by the housing box to be pivotally movable around a pivot shaft between a separation position where the inside of the housing box is separated into an electrical component housing space as one of the two spaces, facing the electrical component attachment surface, and the other housing space facing an opposite surface other than the electrical component attachment surface out of the front and back surface of the partition board, and a maintenance position where the electrical component attachment surface faces the maintenance opening.

Another aspect of the invention is to provide a construction machine including a driver's seat, a driver's seat floor on which the driver's seat is disposed, and the electrical component housing device having the above arrangement. In this arrangement, the housing box is disposed on the driver's seat floor, with the maintenance opening being opened in a forward direction of the construction machine, and the driver's seat is attached to an upper surface of the housing box.

According to the arrangement of the invention, it is possible to make a space adjacent to the electrical component housing space large, while securing maintenance of the electrical component even in a condition that the housing space is restricted.

These and other objects, features and advantages of the present invention will become more apparent upon reading the following detailed description along with the accompanying drawings.

DESCRIPTION OF THE PREFERRED EMBODIMENTS

Figure 1:
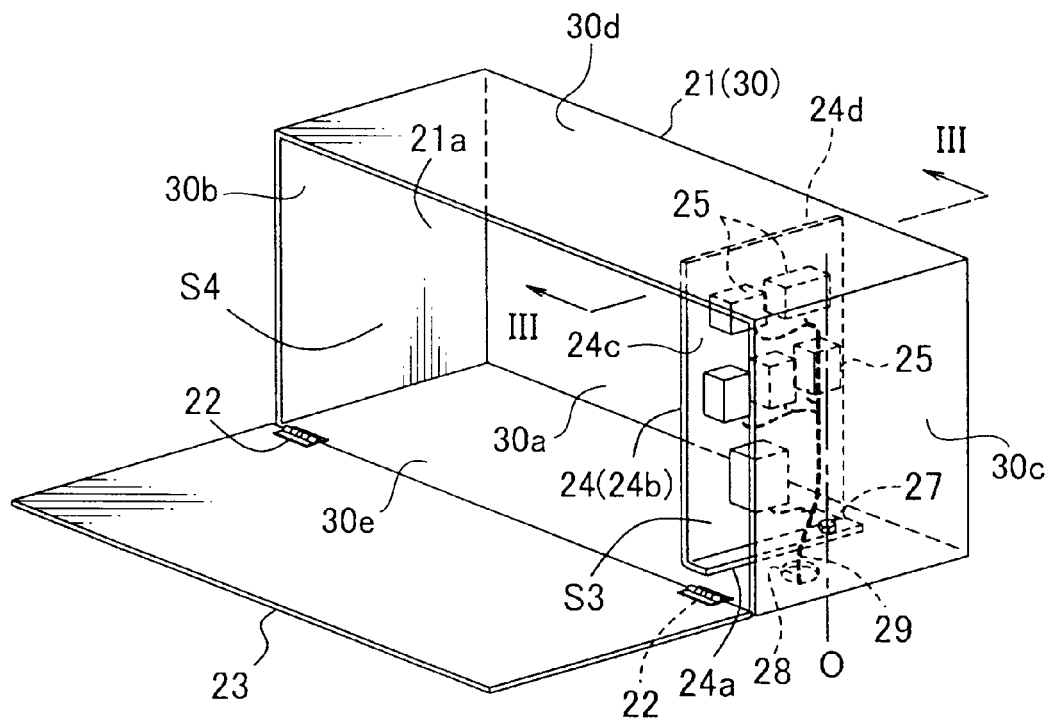
FIG. 1 is a perspective view of an electrical component housing device embodying the invention in a state that a partition board is pivotally moved to a separation position.

In the following, an embodiment of the invention is described referring to the drawings. The following embodiment is merely an example embodying the invention, and does not limit the technical scope of the invention.

The embodiment of the invention is mainly disclosed in FIGS. 1 to 4.

An electrical component housing device embodying the invention has a housing box which also serves as a seat stand of a compact hydraulic shovel, as well as the background art. The following is an example, wherein electrical components and machine tools are housed in the housing box.

Specifically, a compact hydraulic shovel embodying the invention is provided with a crawler-type lower propelling body 1, an upper slewing body 2 which is loaded on the lower propelling body 1 to be slewable around a vertical axis, and a working attachment 3 mounted on a front part of the upper slewing body 2.

Figure 5:
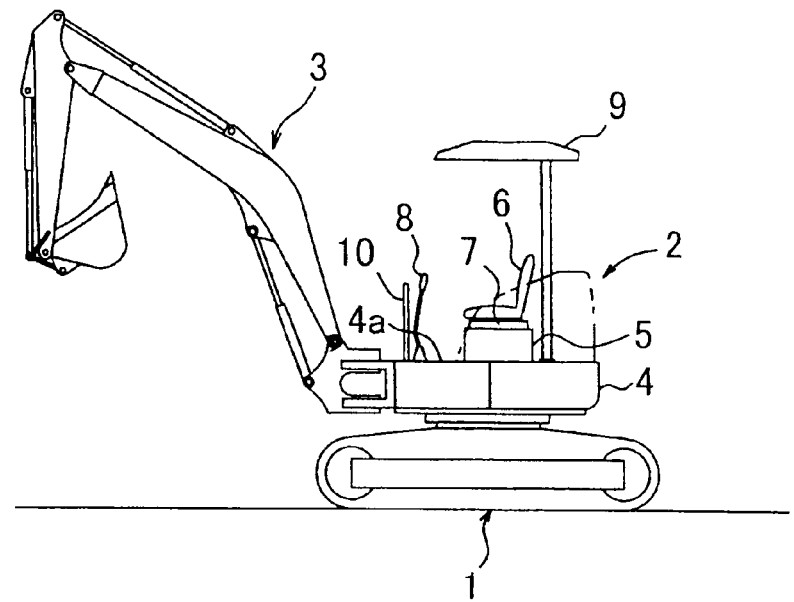
FIG. 5 is a schematic side view of a compact hydraulic shovel, as an application example of the invention.
Figure 6:
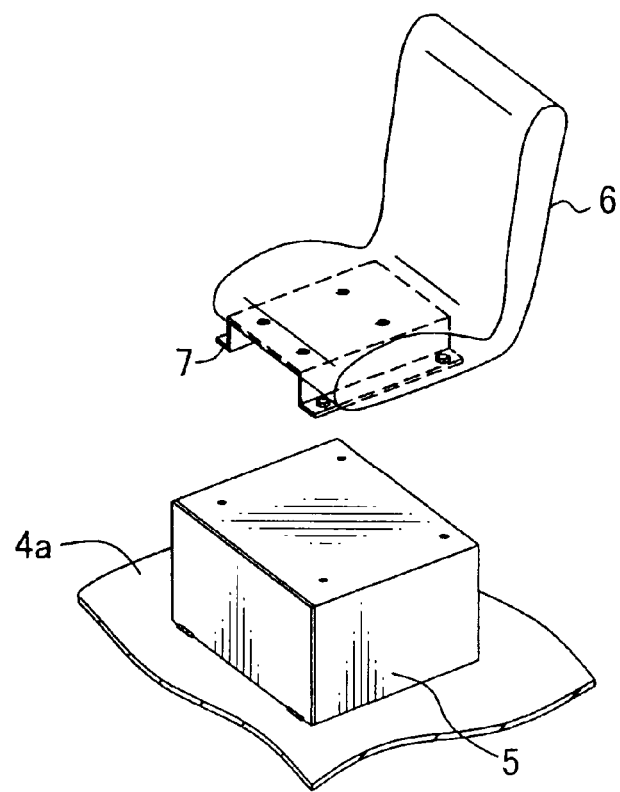
FIG. 6 is an exploded perspective view of peripheral devices around a driver's seat of the compact hydraulic shovel shown in FIG. 5.
Figure 7:
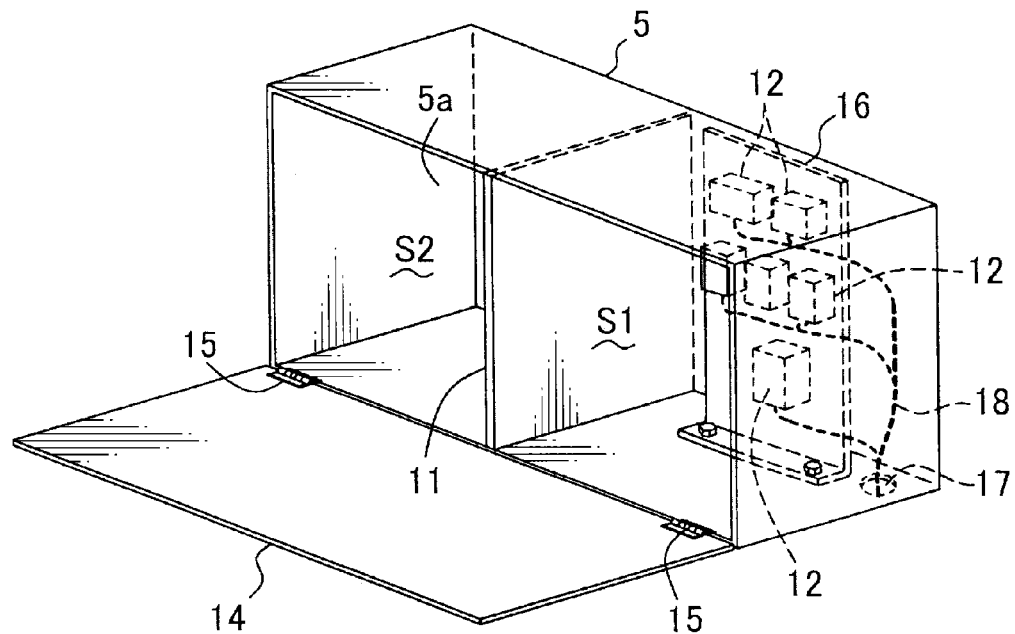
FIG. 7 is a diagram showing a comparative example (prior art) corresponding to the example shown in FIG. 1.
Figure 8:
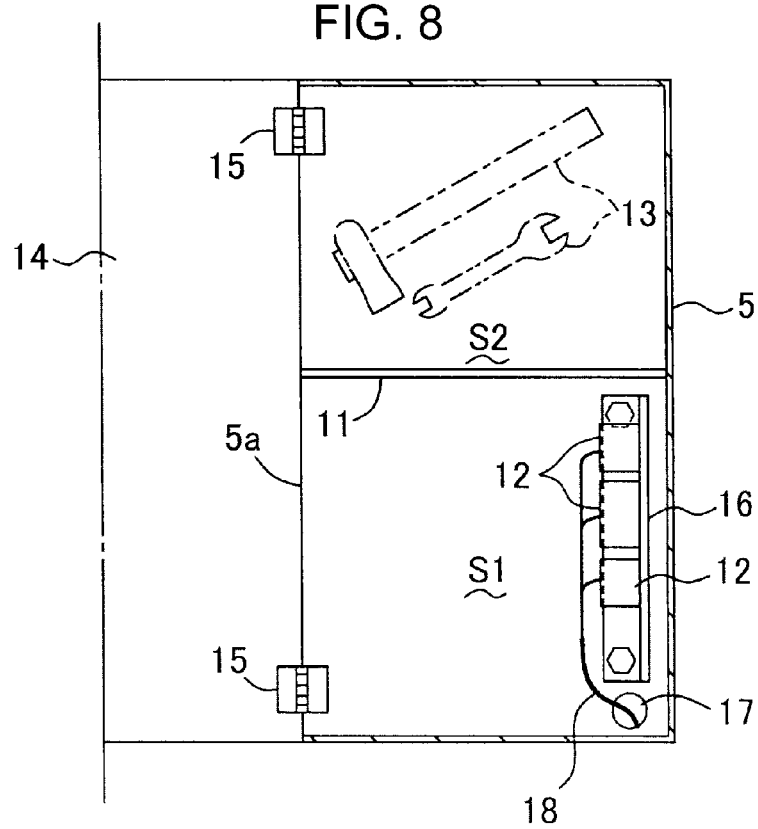
FIG. 8 is a horizontal cross-sectional view enlargedly showing the comparative example (prior art) shown in FIG. 7.

The upper propelling body 2 has substantially the same construction as the conventional art (prior art) disclosed in FIGS. 5 and 6 except for some arrangements.

Specifically, the upper slewing body 2 is provided with an upper frame 4, a housing box 21 (see FIGS. 1 to 4) which is disposed on an upper surface (driver's seat floor 4a) of the upper frame 4 and which also serves as a seat stand, a partition board 24 (see FIGS. 1 to 4) which is disposed in the housing box 21 and is adapted to separate the inside of the housing box 21, electrical components 25 (see FIGS. 1 to 4) attached to the partition board 24, a trunk harness 29 (see FIGS. 1 to 4) connected to the electrical components 25, a base 7 disposed on the housing box 21, a driver's seat 6 disposed on the housing box 21 via the base 7, a canopy 9 which covers the driver's seat 6 from above, a handrail 10 attached to a front end of the driver's seat floor 4a, and various operation levers (a propelling lever 8 is shown as an example of the operation levers in FIG. 5) which are provided on the driver's seat floor 4a.

Referring to FIGS. 1 to 4, the housing box 21 has a rectangular parallelepiped box-like shape. Specifically, the housing box 21 is provided with a box body 30 for housing the electrical components 25 and machine tools 26 therein, and an opening/closing cover 23 which is pivotally mounted to the box body 30 by hinges 22, 22. The box body 30 is formed with a forwardly-opened maintenance opening 21a. Specifically, the box body 30 is provided with a transversely-extending substantially rectangular back part 30a; and a right wall 30b, a left wall 30c, a top wall 30d, and a bottom wall 30e each of which protrudes forward from a peripheral edge of the back part 30a (namely, which stands upright from the peripheral edge). In other words, the maintenance opening 21a is formed in the housing box 21 at a position opposing to the back part 30a (namely, at a front end position of the walls 30b to 30e). The opening/closing cover 23 is pivotally movable around a transverse axis up and down between a position where the maintenance opening 21a of the box body 30 is closed, and a position where the maintenance opening 21a is opened. Specifically, a base end of the opening/closing cover 23 is interconnected to a front end of the bottom wall 30e via the hinges 22, 22 which have a transversely extending pivot axis.

A wiring port 28 passing through the bottom wall 30e is formed in the bottom wall 30e of the housing box 21. The trunk harness 29 formed by bundling harnesses for connecting the respective electrical components 25 to an external device is drawn into the housing box 21 through the wiring port 28. In this embodiment, the wiring port 28 is formed in the bottom wall 30e positioned in an electrical component housing space S3 to be described later.

The partition board 24 has front and back surfaces 24c, 24d (corresponding to the left and right surfaces of the partition board 24 in FIG. 1) for separating the inside of the housing box 21 in such a manner that two spaces are formed side by side when viewed from the maintenance opening 21a. Specifically, as shown in FIG. 1, by disposing the partition board 24 upright in the housing box 21, the inside of the housing box 21 is separated into the left-side electrical component housing space S3 facing an electrical component attachment surface 24c, as one of the front and back surfaces of the partition board 24, and a right-side machine tool housing space (the other housing space) S4 facing the back surface (the opposite surface) 24d other than the electrical component attachment surface 24c out of the front and back surfaces 24c, 24d of the partition board. The electrical components 25 such as a relay member are housed in the electrical component housing space S3. On the other hand, the machine tools 26 such as a spanner wrench, and a hammer are housed in the machine tool housing space S4 (see FIG. 4).

The partition board 24 is manufactured by bending a metal plate. Specifically, the partition board 24 is provided with a board body 24b having the electrical component attachment surface 24c and the back surface 24d, and a support part 24a extending horizontally from a lower end of the board body 24b. The support part 24a is pivotally supported by the bottom wall 30e around a pivot shaft 27 (a bolt in FIG. 1) which extends perpendicular to the bottom wall 30e of the housing box 21. Specifically, the partition board 24 is pivotally movable around the pivot shaft 27 between a separation position shown by the solid line in FIGS. 3 and 4, and a maintenance position shown by the imaginary line in FIGS. 2 and 4. When the partition board 24 is set to the separation position, the inside of the housing box 21 is separated into the left-side electrical component housing space S3 facing the electrical component attachment surface 24c of the partition board 24, and the right-side machine tool housing space S4 facing the back surface 24d of the partition board 24. On the other hand, when the partition board 24 is set to the maintenance position, the electrical component attachment surface 24c faces the maintenance opening 21a.

The pivot shaft 27 is disposed at one of both ends of the partition board 24 at the separation position, the one end is positioned away from the maintenance opening 21a (namely, on the side close to the back part 30a), in the depth directions of the electrical component housing device extending from the maintenance opening 21a to the inside of the housing box 21 (back part 30a). In the drawings, the symbol O denotes a vertical line passing the pivot shaft 27, in other words, an axis of pivotal movement of the partition board 24.

A pivot radius R1 (see FIG. 4) from the center of the pivot shaft 27 to a free end of the partition board 24 is defined as follows. Specifically, the pivot radius R1 is set longer than a maximum distance D1 between the electrical component attachment surface 24c of the partition board 24 and the left wall 30c facing the electrical component attachment surface 24c. With this arrangement, pivotal movement of the partition board 24 toward the electrical component housing space S3 is restricted by contact of the partition board 24 with the left wall 30c. The term "maximum distance D1" means a maximum distance out of the distances between the left wall 30c and the electrical component attachment surface 24c, in the case where the left wall 30c is formed into a curved surface. On the other hand, the pivot radius R1 is set shorter than a minimum distance D2 between the back surface 24d of the partition board 24 and the right wall 30b facing the back surface 24d. With this arrangement, since contact of the partition board 24 with the right wall 30b is avoided during pivotal movement of the partition board 24, the partition board 24 is allowed to pivotally move in the machine tool housing space S4. The term "minimum distance D2" means a minimum distance out of the distances between the right wall 30b and the back surface 24d facing the electrical component attachment surface 24c, in the case where the right wall 30b is formed into a curved surface. Setting the pivot radius D1 as described above enables to pivotally move the partition board 24 to the maintenance position, while maximally suppressing an increase in the size of the electrical component housing space S3. Thus, it is possible to secure a space enough for maintenance of the electrical components 25.

The electrical components 25 are attached to the electrical component attachment surface 24c of the partition board 24. Accordingly, the electrical components 25 are disposed in the electrical component housing space S3 by pivotally moving the partition board 24 to the separation position. On the other hand, by pivotally moving the partition board 24 to the maintenance position, the electrical components 25 are allowed to face the maintenance opening 21a, whereby the operator is accessible to the electrical components 25 from the outside through the maintenance opening 21a for maintenance (such as checking or exchanging the electrical components 25). As described above, in this embodiment, the partition board 24 also serves as a support member for supporting the electrical components 25.

The trunk harness 29 is formed by bundling a plurality of branch harnesses 29a (see FIG. 3) for connecting the respective electrical components 25 to an external device. The trunk harness 29 is drawn into the housing box 21 (electrical component housing space S3) from the outside through the wiring port 28 formed in the housing box 21. Firstly, the position arrangement of the wiring port 28 is described to explain a wiring manner of the trunk harness 29. The wiring port 28 is formed in a position (a position in proximity to the partition board 24 at the separation position) on the left side in the electrical component housing space S3. Specifically, the wiring port 28 is formed in a position close to the pivot shaft 27 with respect to an intermediate position of the housing box 21 in the forward and rearward directions (the depth direction).

Figure 3:
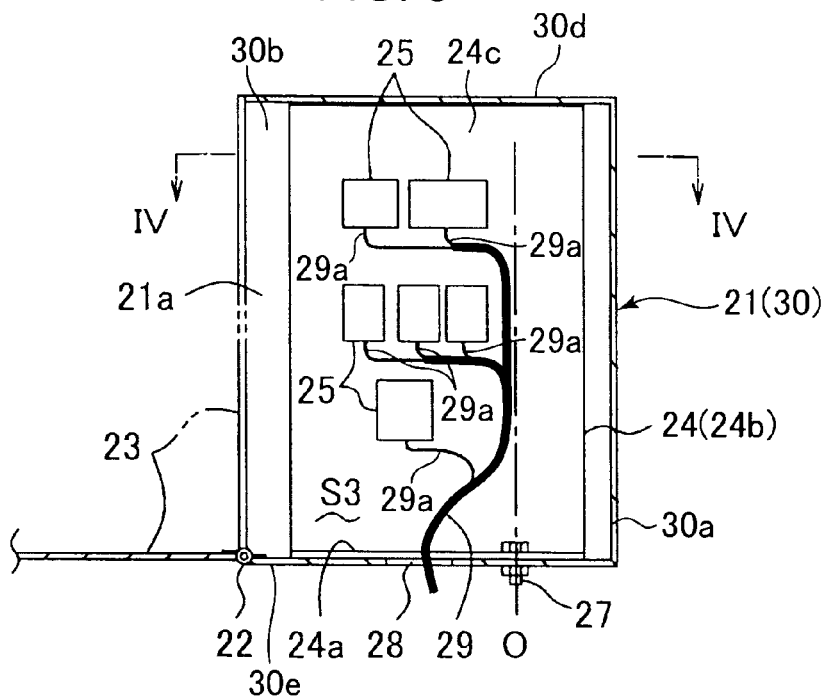
FIG. 3 is an enlarged cross-sectional view taken along the line III-III in FIG. 1.

The trunk harness 29 is drawn into the housing box 21 through the wiring port 28. Further at least one portion of the trunk harness 29 is raised along the axis O of pivotal movement of the partition board 24. Then, each of the branch harnesses 29a branched out of the trunk harness 29 in the housing box 21 is connected to each of the electrical components 25. In FIG. 3, the trunk harness 29 is shown by the thick line, and the branch harnesses 29a are shown by the middle line.

In the following, a method of using the electrical component housing device embodying the invention is described.

Figure 4:
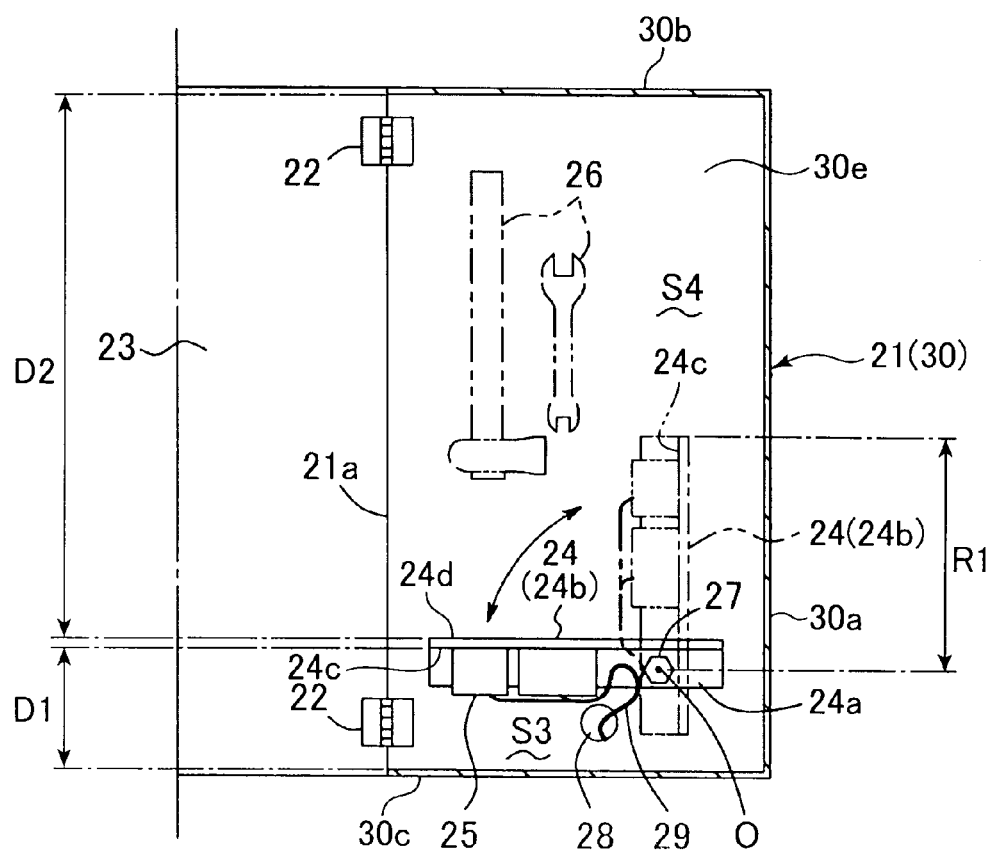
FIG. 4 is a cross-sectional view taken along the line IV-IV in FIG. 3.

In the case where maintenance is not required, the partition board 24 is disposed at the separation position shown by the solid line in FIGS. 1, 3 and 4. When the partition board 24 is pivotally moved to the separation position, the inside of the housing box 21 is separated into the electrical component housing space S3 and the machine tool housing space S4 by the partition board 24.

Figure 2:
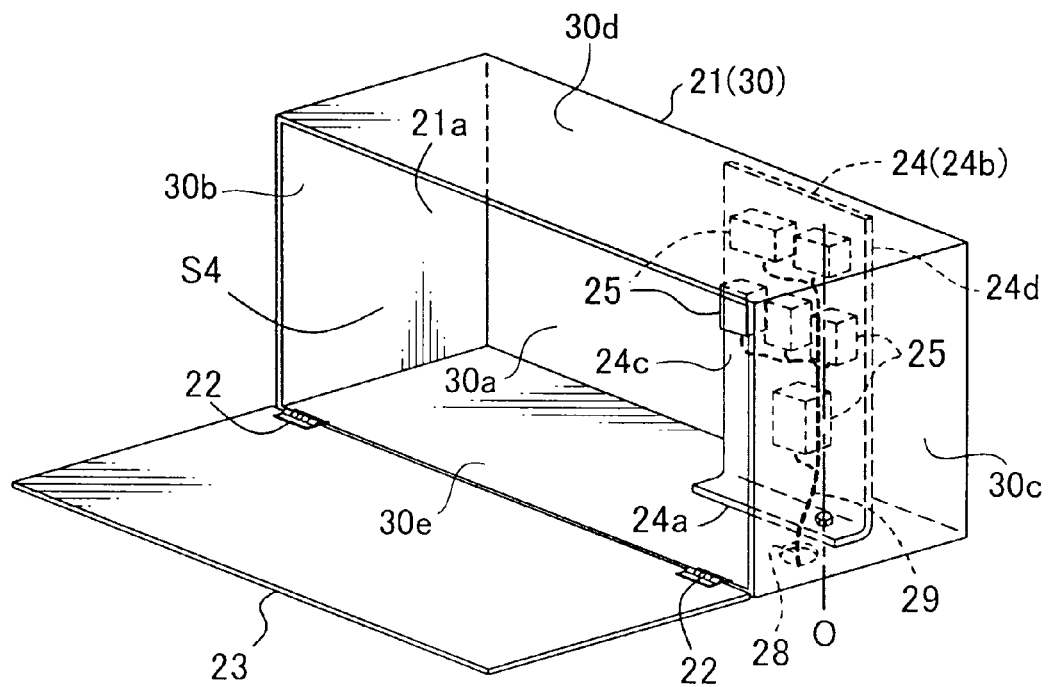
FIG. 2 is a perspective view showing a state that the partition board shown in FIG. 1 is pivotally moved to a maintenance position.

In the case where maintenance is required, the partition board 24 is pivotally moved to the maintenance position as shown by the two-dotted chain line in FIG. 4 and as shown in FIG. 2. When the partition board 24 is pivotally moved to the maintenance position, the electrical components 25 attached to the partition board 24 face the maintenance opening 21a. Then, the operator is allowed to perform maintenance (such as checking or exchanging) of the electrical components 25 from the outside through the maintenance opening 21a.

In the case where the operator finds the machine tools housed in the machine tool housing space S4 are an obstacle in pivotally moving the partition board 24 or performing maintenance, the operator may temporarily take out the machine tools from the machine tool housing space S4.

As described above, in this embodiment, the partition board 24 is pivotally movable between the separation position where the inside of the hosing box 21 is separated into the electrical component housing space S3 and the machine tool housing space S4, and the maintenance position where the electrical component attachment surface 24c faces the maintenance opening 21a. With this arrangement, it is possible to make the machine tool housing space S4 large while retaining the electrical component housing space S3 of a minimum size enough for housing the electrical components 25 by pivotally moving the partition board 24 to the separation position during a time other than a maintenance time of the electrical components 25. On the other hand, at a maintenance time, it is possible to secure a space required for maintenance of the electrical components 25 by pivotally moving the partition board 24 to the maintenance position.

As described above, in this embodiment, it is possible to satisfy both of the requirements i.e. securing maintenance of the electrical components 25 and making the machine tool housing space S4 large even in a condition that the size of the housing box 21 is restricted.

Further, in this embodiment, the partition board 24 also serves as a support member for use in attaching the electrical components. With this arrangement, it is possible to reduce the number of parts to thereby realize cost reduction, and to expand the usable space in the housing space 21.

In this embodiment, the pivot shaft 27 (axis of pivotal movement) of the partition board 24 is disposed at one of both ends of the partition board 24 at the separation position, the one end is positioned away from the maintenance opening 21a (at a rear side of the housing box 21), in the forward and rearward directions (the depth direction) of the electrical component housing device extending from the maintenance opening 21a to the inside of the housing box 21. With this arrangement, the partition board 24 is pivotally movable from the separation position to the maintenance position along a route passing the machine tool housing space S4 while making the machine tool housing space S4 large by mounting the partition board 24 to a position close to a corner of the housing box 21 to make the machine tool housing space S4 large.

The above arrangement enables to maximally expand the machine tool housing space S4.

In this embodiment, the branch harness 29a (trunk harness 29) is wired along the axis of pivotal movement of the partition board 24. Accordingly, it is possible to reduce the moving amount of the branch harnesses 29a accompanied by pivotal movement of the partition board 24. This makes it easy to reduce a flexed amount of the branch harnesses 29a accompanied by pivotal movement of the partition board 24. In particular, in this embodiment, the trunk harness 29 formed by bundling the branch harnesses 29a is wired along the axis O of pivotal movement of the partition board 24. Accordingly, it is possible to reduce a flexed amount of the trunk harness 29 having low flexibility with a simplified arrangement.

In this embodiment, it is possible to separate the inside of the housing box 21 by movably disposing the partition board 24 to such a position as to extend along a depth direction of the housing box 21 extending from the maintenance opening 21a to the back part 30a of the housing box 21, and to perform maintenance of the electrical components 25 by movably disposing the partition board 24 to such a position as to extend along the back part 30a. With this arrangement, it is possible to make the machine tool housing space S4 large while retaining the electrical component hosing space S3 of a minimum size enough for housing the electrical components 25 by pivotally moving the partition board 24 to the separation position during a time other than a maintenance time. On the other hand, at a maintenance time, it is possible to perform maintenance of the electrical components 25, while utilizing substantially the entire inner space of the housing box 21 surrounded by the walls 30b to 30e.

In this embodiment, the pivot shaft 27 (axis O of pivotal movement) is disposed at one of both ends of the partition board 24 at the separation position, the one end is disposed at a position close to the back part 30a of the housing box 21, in the forward and rearward directions (the depth direction) of the electrical component housing device extending from the maintenance opening 21a to the back part 30a. Accordingly, it is possible to pivotally move the partition board 24 from the separation position to the maintenance position along a route passing the machine tool housing space S4, while making the machine tool housing space S4 large by mounting the partition board 24 to a position close to a corner of the housing box 21 to make the machine tool housing space S4 large.

Further, in this embodiment, the pivot radius R1 of the partition board 24 is set longer than the distance D1 from the left wall 30c on the side of the electrical component housing space S3, and is set shorter than the distance D2 to the right wall 30b on the side of the machine tool housing space S4. With this arrangement, it is possible to make the machine tool housing space S4 larger than the electrical component housing space S3, and cause the partition board 24 to be pivotally movable from the separation position to the maintenance position along a route passing the machine tool housing space S4.

Furthermore, in this embodiment, the wiring port 28 is formed at a position of the bottom wall 30e of the housing box 21 in the electrical component housing space S3. In other words, the wiring port 28 is formed at a position off the route along which the partition board 24 is pivotally moved from the separation position to the maintenance position. With this arrangement, it is possible to draw the trunk harness 29 into the inside of the housing box 21 without contact with the partition board 24 which is pivotally moved between the separation position and the maintenance position.

In this embodiment, since the housing box 21 also serves as a seat stand for mounting the driver's seat thereon, the size of the housing box 21 is strictly restricted. Even in such a condition, this embodiment is advantageous in making the machine tool housing space S4 large while retaining the electrical component housing space S3 of a minimum size enough for housing the electrical components 25 by pivotally moving the partition board 24 to the separation position during a time other than a maintenance time of the electrical components 25.

<Modifications>

(1) It is possible to draw the trunk harness 29 into the housing box 21 (electrical component housing space S3) by using a large-diametrical hollow shaft as the pivot shaft of the partition board 24, and using the inside of the hollow shaft as a wiring port. In the modification, it is necessary to form the hollow shaft with an opening which is opened in the housing box 21 for passing the trunk harness 29 or the branch harnesses 29a therethrough.

In the above modification, since the trunk harness 29 is disposed at a position closer to the axis O of pivotal movement, the modification is further advantageous in reducing the moving amount of the trunk harness 29 accompanied by pivotal movement of the partition board 24.

(2) In the embodiment, only the lower end of the partition board 24 is pivotally supported by the pivot shaft 27. Alternatively, both of upper and lower ends of the partition board 24 may be pivotally supported.

(3) In the embodiment, the housing box 21 also serves as a seat stand. The invention is not limited to the above example. For instance, as far as a machine is capable of securing a space for installing a dedicated housing box, the dedicated housing box may be disposed at a position other than the seat stand.

In the above modification, it is possible to form a dedicated housing box into a vertically elongated shape, and to separate the inside of the dedicated housing box into upper and lower parts by a horizontal partition board. The horizontal partition board may be pivotally movable up or down at a maintenance time.

(4) In the embodiment, the machine tools 26 are housed in the space S4 formed by separating the inside of the housing box 21. Members to be housed in the space S4 are not limited to the machine tools 26. For instance, members which are preferably separated from the electrical components, and which can be taken out as necessary, may be housed in the space S4.

The aforementioned embodiment and modifications mainly include the invention having the following features.

An aspect of the invention is to provide an electrical component housing device for a construction machine. The electrical component housing device includes a housing box which is formed with a maintenance opening; a partition board including front and back surfaces for separating an inside of the housing box in such a manner that two spaces are formed side by side when viewed from the maintenance opening; and an electrical component which is attached to an electrical component attachment surface as one of the front and back surfaces of the partition board. In this arrangement, the partition board is supported by the housing box to be pivotally movable around a pivot shaft between a separation position where the inside of the housing box is separated into an electrical component housing space as one of the two spaces, facing the electrical component attachment surface, and the other housing space facing an opposite surface other than the electrical component attachment surface out of the front and back surface of the partition board, and a maintenance position where the electrical component attachment surface faces the maintenance opening.

According to the aspect of the invention, it is possible to pivotally move the partition board between the separation position where the inside of the housing box is separated into the electrical component housing space and the other housing space, and the maintenance position where the electrical component attachment surface faces the maintenance opening. Thus, it is possible to make the other housing space large while retaining the electrical component housing space of a minimum size enough for housing the electrical component by pivotally moving the partition board to the separation position during a time other than a maintenance time of the electrical component. On the other hand, at a maintenance time, it is possible to secure a space necessary for maintenance of the electrical component by pivotally moving the partition board to the maintenance position.

In other words, according to the aspect of the invention, it is possible to satisfy both of the requirements i.e. securing maintenance of the electrical component and making the other space large even in a condition that the size of the housing box is restricted.

Further, according to the aspect of the invention, the partition board also serves as a support member for use in attaching the electrical component. With this arrangement, it is possible to reduce the number of parts to thereby realize cost reduction, and to expand the usable space in the housing space.

In the electrical component housing device, preferably, the pivot shaft of the partition board may be disposed at one of both ends of the partition board at the separation position, the one end being positioned away from the maintenance opening, in a depth direction of the electrical component housing device extending from the maintenance opening to the inside of the housing box.

In the above arrangement, the pivot shaft (axis of pivotal movement) of the partition board is disposed at one of both ends of the partition board at the separation position, at a position away from the maintenance opening (at a inner side of the housing box), in the depth direction of the electrical component housing device extending from the maintenance opening to the inside of the housing box. With this arrangement, the partition board is pivotally movable from the separation position to the maintenance position along a route passing the other housing space while making the other housing space large by mounting the partition board to a position close to a corner of the housing box to make the other housing space large.

The above arrangement enables to maximally expand the other housing space.

In the electrical component housing device, preferably, the housing box may be formed with a wiring port, the electrical component housing device may further include at least one harness to be connected to the electrical component, and the at least one harness may be drawn into the housing box through the wiring port, and be wired along an axis of pivotal movement of the partition board.

In the above arrangement, the harness is wired along the axis of pivotal movement of the partition board. Accordingly, it is possible to reduce the moving amount of the harnesses accompanied by pivotal movement of the partition board. This makes it easy to reduce a flexed amount of the harness accompanied by pivotal movement of the partition board.

In the electrical component housing device, preferably, a plurality of the electrical components may be attached to the electrical component attachment surface, and a trunk harness formed by bundling a plurality of harnesses to be respectively connected to the electrical components may be drawn into the housing box through the wiring port, and be wired along the axis of pivotal movement of the partition board.

In the above arrangement, the trunk harness formed by bundling the plurality of harnesses is wired along the axis of pivotal movement of the partition board. Accordingly, it is possible to reduce the moving amount of the trunk harness accompanied by pivotal movement of the partition board. This makes it easy to reduce a flexed amount of the trunk harness accompanied by pivotal movement of the partition board.

In the electrical component housing device, preferably, the housing box may include a back part, and a wall which stands upright from a periphery of the back part, the maintenance opening may be formed in the housing box at a position opposing to the back part of the housing box, and the partition board may be disposed at such a position as to extend along a depth direction of the electrical component housing device extending from the maintenance opening to the back part when the partition board is set to the separation position, and may be disposed at such a position as to extend along the back part when the partition board is set to the maintenance position.

In the above arrangement, it is possible to separate the inside of the housing box by movably disposing the partition board to such a position as to extend along a depth direction of the electrical component housing device extending from the maintenance opening to the back part, and to perform maintenance of the electrical components by movably disposing the partition board to such a position as to extend along the back part. With this arrangement, it is possible to make the other housing space large while retaining the electrical component hosing space of a minimum size enough for housing the electrical components by pivotally moving the partition board to the separation position during a time other than a maintenance time. On the other hand, at a maintenance time, it is possible to perform maintenance of the electrical components, while utilizing substantially the entire space in the housing box surrounded by the wall.

In the electrical component housing device, preferably, the pivot shaft of the partition board may be disposed at one of both ends of the partition board at the separation position, the one end being positioned close to the back part of the housing box, in the depth direction.

In the above arrangement, the pivot shaft is disposed at one of both ends of the partition board at the separation position, the one end is at a position close to the back part of the housing box, in the depth direction extending from the maintenance opening to the back part. Accordingly, it is possible to pivotally move the partition board from the separation position to the maintenance position along a route passing the other housing space, while making the other housing space large by mounting the partition board to a position close to a corner of the housing box to make the other housing space large.

In the electrical component housing device, preferably, a pivot radius from a center of the pivot shaft to a free end of the partition board may be set longer than a maximum distance between the electrical component attachment surface of the partition board at the separation position and the wall of the housing box facing the electrical component attachment surface, and may be set shorter than a minimum distance between the opposite surface of the partition board at the separation position and the wall of the housing box facing the opposite surface.

In the above arrangement, the pivot radius of the partition board is set longer than the distance (maximum distance) from the partition board to the wall on the side of the electrical component housing space, and is set shorter than the distance (minimum distance) from the partition board to the wall on the side of the other housing space. With this arrangement, it is possible to make the other housing space larger than the electrical component housing space, and cause the partition board to be pivotally movable from the separation position to the maintenance position along a route passing the other housing space.

In the electrical component housing device, preferably, a part of the wall of the housing box in the electrical component housing space may be formed with a wiring port passing through the wall, and the electrical component housing device may further include at least one harness drawn into the housing box through the wiring port, and connected to the electrical component.

In the above arrangement, the wiring port is formed in the part of the wall of the housing box within the electrical component housing space. In other words, the wiring port is formed at a position off the route along which the partition board is pivotally moved from the separation position to the maintenance position. With this arrangement, it is possible to draw the harness into the housing box without contact with the partition board which is pivotally moved between the separation position and the maintenance position.

In the electrical component housing device, preferably, the at least one harness may be wired along an axis of pivotal movement of the partition board.

In the above arrangement, the harness is wired along the axis of pivotal movement of the partition board. Accordingly, it is possible to reduce the moving amount of the harnesses accompanied by pivotal movement of the partition board. This makes it easy to reduce a flexed amount of the harness accompanied by pivotal movement of the partition board.

In the electrical component housing device, preferably, a plurality of the electrical components may be attached to the electrical component attachment surface, and a trunk harness formed by bundling a plurality of harnesses to be connected to the respective electrical components may be drawn into the housing box through the wiring port, and be wired along the axis of pivotal movement of the partition board.

In the above arrangement, the thick trunk harness formed by bundling the plurality of harnesses is wired along the axis of pivotal movement of the partition board. With this arrangement, it is also possible to reduce the moving amount of the trunk harness accompanied by pivotal movement of the partition board. This also makes it easy to reduce a flexed amount of the trunk harnesses accompanied by pivotal movement of the partition board.

Another aspect of the invention is to provide a construction machine including a driver's seat; a driver's seat floor on which the driver's seat is disposed; and the electrical component housing device having any one of the aforementioned arrangements. In this arrangement, the housing box is disposed on the driver's seat floor, with the maintenance opening being opened in a forward direction of the construction machine, and the driver's seat is attached to an upper surface of the housing box.

In the invention, since the housing box also serves as a seat stand for mounting a driver's seat thereon, the size of the housing box is strictly restricted. The invention, however, is advantageous in making the other housing space large while retaining the electrical component housing space of a minimum size enough for housing the electrical components by pivotally moving the partition board to the separation position at a time other than a maintenance time of the electrical components, even in such a condition.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electrical component housing device for a construction machine, comprising:
    a housing box which is formed with a maintenance opening;
    a partition board including front and back surfaces for separating an inside of the housing box in such a manner that two spaces are formed side by side when viewed from the maintenance opening; and
    an electrical component which is attached to an electrical component attachment surface as one of the front and back surfaces of the partition board, wherein
    the partition board is supported by the housing box to be pivotally movable around a pivot shaft between a separation position where the inside of the housing box is separated into an electrical component housing space as one of the two spaces, facing the electrical component attachment surface, and the other housing space facing an opposite surface other than the electrical component attachment surface out of the front and back surface of the partition board, and a maintenance position where the electrical component attachment surface faces the maintenance opening.

2. The electrical component housing device according to claim 1, wherein
    the pivot shaft of the partition board is disposed at one of both ends of the partition board at the separation position, the one end being positioned away from the maintenance opening, in a depth direction of the electrical component housing device extending from the maintenance opening to the inside of the housing box.

3. The electrical component housing device according to claim 1, wherein
the housing box is formed with a wiring port,
the electrical component housing device further includes at least one harness to be connected to the electrical component, and
the at least one harness is drawn into the housing box through the wiring port, and is wired along an axis of pivotal movement of the partition board.

4. The electrical component housing device according to claim 3, wherein
a plurality of the electrical components are attached to the electrical component attachment surface, and
a trunk harness formed by bundling a plurality of harnesses to be respectively connected to the electrical components is drawn into the housing box through the wiring port, and is wired along the axis of pivotal movement of the partition board.

5. The electrical component housing device according to claim 1, wherein
the housing box includes a back part, and a wall which stands upright from a periphery of the back part,
the maintenance opening is formed in the housing box at a position opposing to the back part of the housing box, and
the partition board is disposed at such a position as to extend along a depth direction of the electrical component housing device extending from the maintenance opening to the back part when the partition board is set to the separation position, and is disposed at such a position as to extend along the back part when the partition board is set to the maintenance position.

6. The electrical component housing device according to claim 5, wherein
the pivot shaft of the partition board is disposed at one of both ends of the partition board at the separation position, the one end being positioned close to the back part of the housing box, in the depth direction.

7. The electrical component housing device according to claim 6, wherein
a pivot radius from a center of the pivot shaft to a free end of the partition board is set longer than a maximum distance between the electrical component attachment surface of the partition board at the separation position and the wall of the housing box facing the electrical component attachment surface, and is set shorter than a minimum distance between the opposite surface of the partition board at the separation position and the wall of the housing box facing the opposite surface.

8. The electrical component housing device according to claim 7, wherein
a part of the wall of the housing box in the electrical component housing space is formed with a wiring port passing through the wall, and
the electrical component housing device further includes at least one harness drawn into the housing box through the wiring port, and connected to the electrical component.

9. The electrical component housing device according to claim 8, wherein
the at least one harness is wired along an axis of pivotal movement of the partition board.

10. The electrical component housing device according to claim 9, wherein
a plurality of the electrical components are attached to the electrical component attachment surface, and
a trunk harness formed by bundling a plurality of harnesses to be respectively connected to the electrical components is drawn into the housing box through the wiring port, and is wired along the axis of pivotal movement of the partition board.

11. A construction machine, comprising:
a driver's seat;
a driver's seat floor on which the driver's seat is disposed; and
an electrical component housing device including:
a housing box which is formed with a maintenance opening;
a partition board including front and back surfaces for separating an inside of the housing box in such a manner that two spaces are formed side by side when viewed from the maintenance opening; and
an electrical component which is attached to an electrical component attachment surface as one of the front and back surfaces of the partition board, wherein
the partition board is supported by the housing box to be pivotally movable around a pivot shaft between a separation position where the inside of the housing box is separated into an electrical component housing space as one of the two spaces, facing the electrical component attachment surface, and the other housing space facing an opposite surface other than the electrical component attachment surface out of the front and back surface of the partition board, and a maintenance position where the electrical component attachment surface faces the maintenance opening,
the housing box is disposed on the driver's seat floor, with the maintenance opening being opened in a forward direction of the construction machine, and
the driver's seat is attached to an upper surface of the housing box.

* * * * *